United States Patent
Mizuno (10) Patent No.: US 10,452,917 B2
(45) Date of Patent: Oct. 22, 2019

(54) ATTENTION OBJECT-RELATED INFORMATION PROVIDING SYSTEM AND INFORMATION PROVIDING METHOD

(71) Applicant: Alpha Code Inc., Tokyo (JP)

(72) Inventor: Takuhiro Mizuno, Tokyo (JP)

(73) Assignee: ALPHA CODE INC., Tokyo (JP)

( * ) Notice: Subject to any disclaimer, the term of this patent is extended or adjusted under 35 U.S.C. 154(b) by 0 days.

(21) Appl. No.: 16/328,215

(22) PCT Filed: Jul. 27, 2017

(86) PCT No.: PCT/JP2017/027221
§ 371 (c)(1),
(2) Date: Feb. 25, 2019

(87) PCT Pub. No.: WO2018/042963
PCT Pub. Date: Mar. 8, 2018

(65) Prior Publication Data
US 2019/0244025 A1    Aug. 8, 2019

(30) Foreign Application Priority Data
Aug. 30, 2016    (JP) ................................ 2016-167511

(51) Int. Cl.
*G06K 9/00*    (2006.01)
*G02B 27/01*    (2006.01)

(52) U.S. Cl.
CPC ....... *G06K 9/00671* (2013.01); *G02B 27/017* (2013.01); *G02B 2027/014* (2013.01)

(58) Field of Classification Search
None
See application file for complete search history.

(56) References Cited

U.S. PATENT DOCUMENTS

2007/0156540 A1*   7/2007   Koren ................. G06Q 10/087
                                                                705/14.51
2013/0241925 A1*   9/2013   Konami ................. G06T 15/08
                                                                  345/419

(Continued)

FOREIGN PATENT DOCUMENTS

| CN | 105027033 A | 11/2015 |
| JP | 08287085 A | 11/1996 |

(Continued)

OTHER PUBLICATIONS

English machine translation of JP5961736B1 (Year: 2015).*

(Continued)

*Primary Examiner* — Hadi Akhavannik
(74) *Attorney, Agent, or Firm* — Polsinelli PC (57) ABSTRACT

The present invention includes: an image reproducing unit 11 that reproduces a three-dimensional image obtained by associating accompanying information with each of one or more objects, and displays the three-dimensional image on an HMD 200; an attention object detecting unit 12 that detects one or more objects to which a viewer pays attention in the three-dimensional image; a ranking unit 13 that ranks attention objects in descending order of the degree of attention; and an accompanying information transmitting unit 14 that provides a user terminal 400 with accompanying information of the attention objects in accordance with the ranking, in which the accompanying information corresponding to the attention object detected when the three-dimensional image is displayed on the HMD 200 is provided to a viewer, through the user terminal 400 different from the HMD 200 after the reproduction of the three-dimensional image is ended or stopped, so that detailed accompanying information related to the object of attention during the (Continued)

viewing of the three-dimensional image can be provided to the viewer after the HMD 200 is removed.

13 Claims, 7 Drawing Sheets

(56) References Cited

U.S. PATENT DOCUMENTS

| | | | | |
|---|---|---|---|---|
| 2014/0132629 | A1* | 5/2014 | Pandey | G02B 27/0172 345/633 |
| 2014/0225918 | A1 | 8/2014 | Mittal et al. | |
| 2014/0375687 | A1* | 12/2014 | Tanaka | G02B 27/0172 345/633 |
| 2016/0284126 | A1* | 9/2016 | Leppanen | G06F 3/011 |
| 2017/0053452 | A1* | 2/2017 | Arai | G06T 19/006 |

FOREIGN PATENT DOCUMENTS

| | | |
|---|---|---|
| JP | 3025173 B | 1/2000 |
| JP | 2004-180272 A | 6/2004 |
| JP | 2005-038008 A | 2/2005 |
| JP | 2012-238232 A | 12/2012 |
| JP | 2014-071811 A | 4/2014 |
| JP | 2015-049637 | 3/2015 |
| JP | 2016-046730 A | 4/2016 |
| JP | 2017-041019 A | 2/2017 |
| WO | WO 2014/126966 A1 | 8/2014 |

OTHER PUBLICATIONS

JP Office Action dated Dec. 4, 2018 in Appln 2016-167511.
CN Office Action dated Jun. 18, 2019 in Chinese patent application No. 2017800519195.

\* cited by examiner

ATTENTION OBJECT-RELATED INFORMATION PROVIDING SYSTEM AND INFORMATION PROVIDING METHOD

CROSS REFERENCE TO RELATED APPLICATIONS

This application is a National Phase filing under 35 U.S.C. § 371 of PCT/JP2017/027221 filed on Jul. 27, 2017; and this application claims priority to Application No. 2016-167511 filed in Japan on Aug. 30, 2016. The entire contents of each application are hereby incorporated by reference.

TECHNICAL FIELD

The present invention relates to an attention object-related information providing system and an information providing method, and more particularly, an information providing system and an information providing method suitable for use in a system for providing accompanying information related to an object to which a user pays attention, among objects displayed in a three-dimensional image.

BACKGROUND ART

In recent years, utilization of virtual reality (VR) technology, which allows a virtual world generated in a computer to be experienced as if the virtual world is real, is spreading. The VRs are classified roughly into one that presents the user with a three-dimensional image generated using computer graphics and the like, and another one that presents the user with a three-dimensional image generated by processing a moving image obtained by photographing the real world for VR. As an example of the latter, one called a moving image of 360 degrees which is viewable in an omnidirectional range of 360 degrees with respect to a movement of a viewer's gaze is also provided.

Application examples of the VR are various. However, it is common that a user wearing a head mount display (HMD) like goggles freely roams in a three-dimensional space depicted for the HMD by the computer so that the user can virtually experience various experiences. The VR can also present a world beyond the real constraints of time and space to the user.

However, the user immediately loses interest in the three-dimensional image simply displayed on the HMD. That is, the three-dimensional image as it is cannot be useful contents or an information transmission medium. On the other hand, there is known a technique of detecting an object, to which the viewer pays attention in the three-dimensional image, and displaying attribute information of the attention object (for example, see Patent Documents 1 and 2).

Patent Document 1 discloses a technique of detecting an attention portion of a viewer that views an image changing with the elapse of time in a three-dimensional image distributed to the viewer, and providing the viewer with useful information corresponding to the attention portion. Specifically, it is disclosed that space-time markers are set by adding accompanying information of an object to a space-time volume, a space-time marker of the object, to which the viewer pays attention based on the detection result of the attention portion, is specified, and the accompanying information in the space-time marker is provided to the viewer. Also, Patent Document 1 discloses a technique of performing predetermined statistical processing by integrating and aggregating gaze data, obtaining data related to the degree of attention on the product information of each space-time marker in all the aggregated viewers, and providing the data to a computer on a business operator side.

Patent Document 2 discloses a technique of storing the attribute information of an object that is disposed in graphics represented in a three-dimensional space, determining the importance of an object based on retrieval information when the retrieval information input from an input unit includes movement information of a viewpoint and a gazing point, and determining an object of which the attribute information is displayed based on the determined importance of the object.

Patent Document 1: JP-A-2016-46730
Patent Document 2: Japanese Patent No. 3025173

DISCLOSURE OF THE INVENTION

However, all of the techniques disclosed in the Patent Documents 1 and 2 mean that the accompanying information corresponding to an object to which the user is paying attention in the three-dimensional image, is displayed in the three-dimensional image during the viewing of the three-dimensional image. Therefore, there is a limit to an information amount and a type of information of the accompanying information that is displayable in a VR space. Moreover, the accompanying information is limited to being displayed only for a short time during which the object is displayed in the three-dimensional image changing with the elapse of time. Therefore, there has been a problem that useful information cannot be sufficiently provided to the viewer.

The present invention is made in order to solve such a problem, and an object of the present invention is to make it possible to use a three-dimensional image as a more useful information transmission medium.

In order to solve the aforementioned problem, the present invention reproduces a three-dimensional image obtained by associating accompanying information with each of one or more objects included in an image changing with the elapse of time and displays the three-dimensional image on a display; detects one or more objects to which a viewer is paying attention in the three-dimensional image; and ranks the objects in descending order of the degree of attention. Then, in a case where the reproduction of the three-dimensional image is ended or stopped, accompanying information corresponding to one or more attention objects is provided to the viewer in accordance with the ranking, through a medium different from the display that has displayed the three-dimensional image.

According to the present invention configured as described above, the accompanying information corresponding to an attention object detected when the three-dimensional image has been displayed on a display such as the HMD, is provided to the viewer, through a medium different from the display after the reproduction of the three-dimensional image is ended or stopped. Therefore, it is possible to provide the viewer with more useful accompanying information, without being restricted by the amount of information, the type of information, the time of providing information, and the like. Then, after the viewer has viewed the three-dimensional image, the viewer can carefully confirm the aforementioned useful accompanying information provided related to the object of attention during the viewing of the three-dimensional image. Moreover, since accompanying information related to one or more attention objects is provided in a state of being ranked in descending order of the degree of attention, the viewer can easily confirm the accompanying information with priority from the object of high attention. As described above, according to the present invention, it becomes possible to utilize the three-dimensional image as a more useful information transmission medium.

BEST MODE FOR CARRYING OUT THE INVENTION

Figure 1:
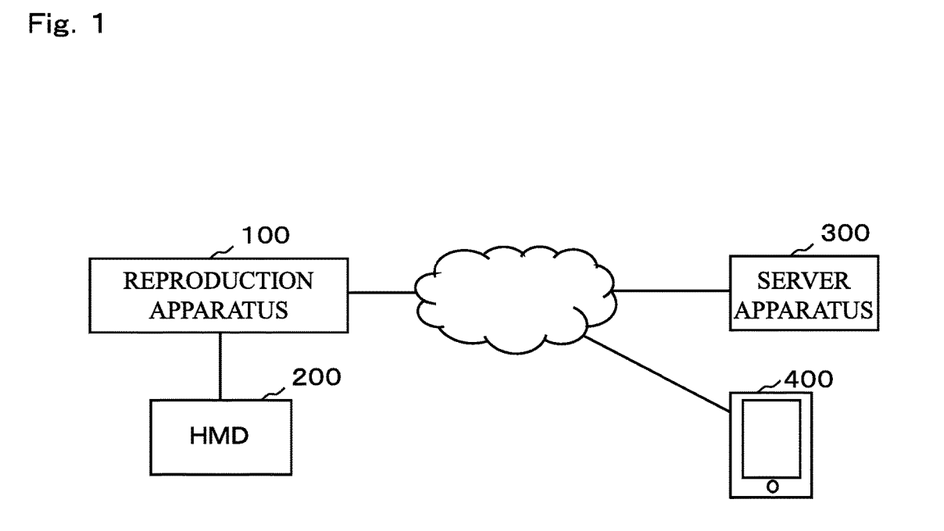
FIG. 1 is a diagram illustrating an example of the overall configuration of an information providing system according to the present embodiment.

An embodiment of the present invention will be described below with reference to the drawings. FIG. 1 is a diagram illustrating an example of the overall configuration of an attention object-related information providing system (hereinafter, simply referred to as an information providing system) according to the present embodiment. As illustrated in FIG. 1, the information providing system according to the present embodiment includes a reproduction apparatus 100, an HMD 200, a server apparatus 300, and a user terminal 400.

Note that, the reproduction apparatus 100, the HMD 200, and the server apparatus 300 may be configured separately as illustrated, or the reproduction apparatus 100 and the HMD 200 may be configured as one computer to be provided. Also, all of the reproduction apparatus 100, the HMD 200, and the server apparatus 300 may be configured to be provided as one computer.

The reproduction apparatus 100 reproduces a three-dimensional image and provides, to a viewer, accompanying information associated with an object in the three-dimensional image, and also functions as an information providing apparatus. The three-dimensional image is a parallax image for generating a three-dimensional space of VR, and the three-dimensional image reproduced by the reproduction apparatus 100 is displayed on the HMD 200 worn by the viewer. The HMD 200 is an example of the display described in the claims.

The server apparatus 300 receives the accompanying information transmitted from the reproduction apparatus 100 and transmits the accompanying information to a user terminal 400 of the viewer designated previously. The user terminal 400 is a terminal used by the viewer, and for example, a mobile terminal such as a smartphone or a tablet terminal can be used.

In the present embodiment, the reproduction apparatus 100 detects what object the viewer wearing the HMD 200 to view the three-dimensional image is paying attention to in the image, and ranks attention objects in descending order of the degree of attention. Then, after the reproduction of the three-dimensional image is ended or stopped, accompanying information related to an attention object is provided from the reproduction apparatus 100 to the user terminal 400 through the server apparatus 300, in accordance with the ranking.

That is, in the present embodiment, an address (for example, an address of an e-mail, an address of a short message, an address of a communication application or an SNS application, and the like) of the user terminal 400 is previously registered on the server apparatus 300 in association with a user ID or the like. The reproduction apparatus 100 provides accompanying information related to the attention object along with the user ID and the like, to the server apparatus 300. The server apparatus 300 provides the user terminal 400 with the accompanying information according to the address of the user terminal 400, which is previously registered in association with the user ID sent from the reproduction apparatus 100.

Figure 2:
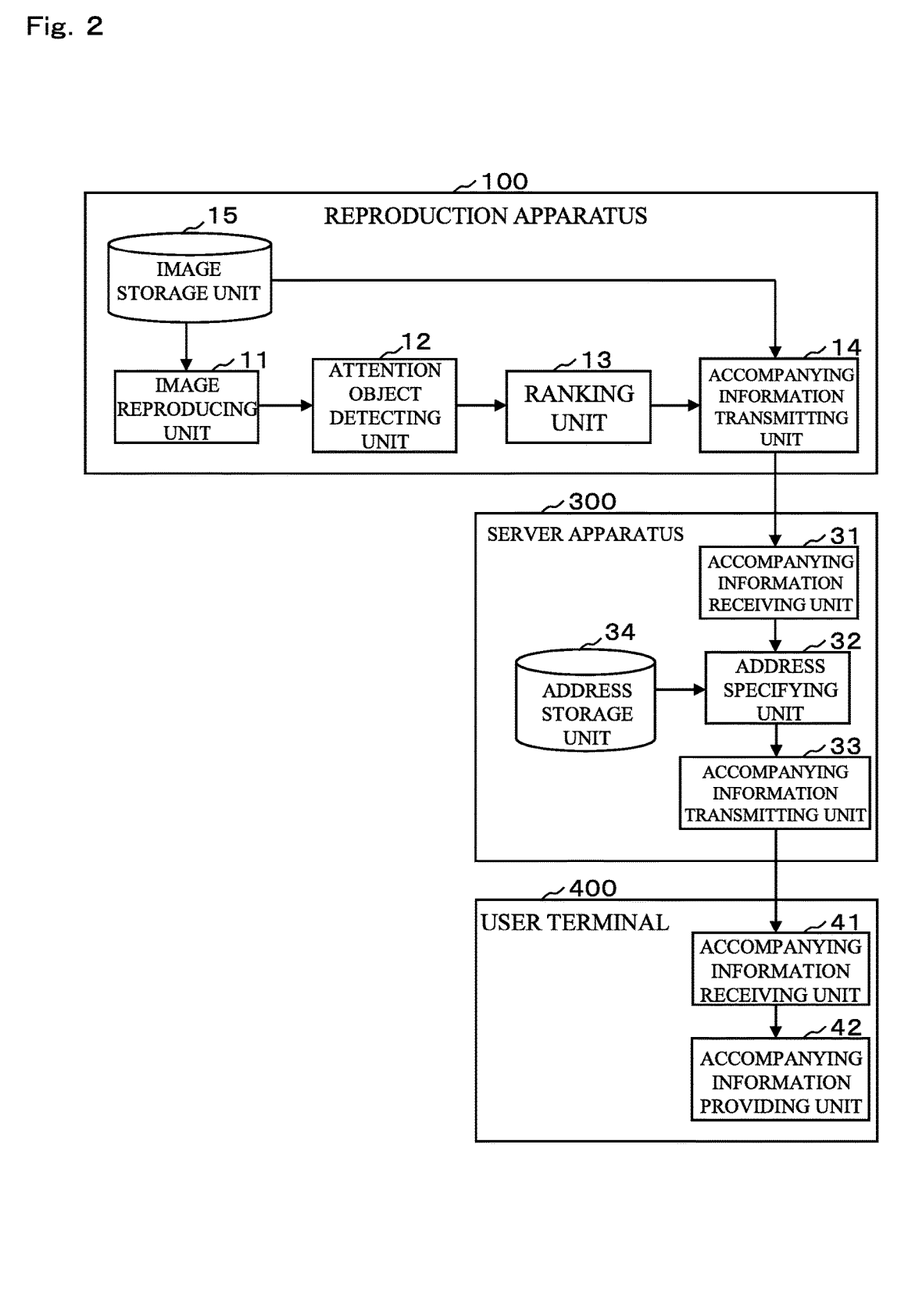
FIG. 2 is a block diagram illustrating an example of the functional configuration of the information providing system according to the present embodiment.

FIG. 2 is a block diagram illustrating an example of the functional configuration of the information providing system according to the present embodiment. As illustrated in FIG. 2, the reproduction apparatus 100 according to the present embodiment includes an image reproducing unit 11, an attention object detecting unit 12, a ranking unit 13, and an accompanying information transmitting unit 14 as its functional configuration. Also, the reproduction apparatus 100 according to the present embodiment includes an image storage unit 15 as a storage medium.

Each of the functional blocks 11 to 14 can be configured by any of hardware, a digital signal processor (DSP), and software. For example, in the case of being configured by software, each of the functional blocks 11 to 14 is actually configured to have a CPU, a RAM, a ROM, and the like of a computer, and is implemented by operations of a program stored in a recording medium such as a RAM, a ROM, a hard disk or a semiconductor memory.

Also, the server apparatus 300 includes an accompanying information receiving unit 31, an address specifying unit 32, and an accompanying information transmitting unit 33 as its functional configuration. Also, the server apparatus 300 includes an address storage unit 34 as a storage medium. Each of the functional blocks 31 to 33 can also be configured by any of hardware, DSP, and software.

Also, the user terminal 400 includes an accompanying information receiving unit 41 and an accompanying information providing unit 42 as its functional configuration. Each of these functional blocks 41 and 42 can also be configured by any of hardware, DSP, and software. Note that, in the case of being configured by software, the functional blocks 41 and 42 may be a dedicated application to which information is provided. Alternatively, it is also possible to use general-purpose applications (the communication application, the short message application, a web browser, an SNS application, and the like).

The image storage unit 15 of the reproduction apparatus 100 stores the three-dimensional image described above. The three-dimensional image is an image of which contents change with the elapse of time, and the three-dimensional image includes one or more objects. Then, the accompanying information is associated with each of the objects. The object becomes an object to which the accompanying information is attached, and as long as an object exists in the image, any object can be set as the object. In other words, the object to which the accompanying information is attached is an object.

The accompanying information is information related to the object, and its contents are optional. For example, the accompanying information is information for describing the object in detail, and the accompanying information can be any one or a combination of text information, audio information, image information, and moving image information. Alternatively, in a case where the object is a specified product, it is also possible to associate a uniform resource locator (URL) of a sales site in which the product can be purchased, a URL of an introduction site, advertisement information, and the like as the accompanying information.

For example, the generator of the three-dimensional image manually associates accompanying information with an object in the image. Specifically, while an original three-dimensional image, to which accompanying information is not added, is reproduced, a desired object in the image is designated and identification information is attached to the object. Furthermore, the identification information is stored in the image storage unit 15 in association with the desired accompanying information. Here, the accompanying information only needs to be associated with the identification information of the object in the three-dimensional image, and may be stored separately from the three-dimensional image. As a method of associating accompanying information with an object and storing the accompanying information, the method described herein is an example, and the present invention is not limited thereto.

Note that, since a three-dimensional image is an image (moving image) in which its contents change with the elapse of time, it is usual that the same object continues to be displayed over a plurality of frames. In this case, with respect to the plurality of frames in which the same object exists, the three-dimensional image is stored in the image storage unit 15 in a state where identification information of the object is attached to each of the frames. Specifying the same object in each frame can be performed by using known image processing techniques for image recognition and object tracking.

The image reproducing unit 11 reproduces the three-dimensional image stored in the image storage unit 15 and displays the three-dimensional image on the HMD 200. The image reproducing unit 11 starts the reproduction of the three-dimensional image in response to the depression of a reproduction button, and automatically ends the reproduction of the three-dimensional image, after reproducing all the three-dimensional images. Also, in a case where a stop button is pressed after the start of the reproduction, the image reproducing unit 11 stops the reproduction of the three-dimensional image at that point.

In the present embodiment, the image reproducing unit 11 reproduces a three-dimensional image including parallax images for generating a three-dimensional space of VR. A gyro sensor or an acceleration sensor is mounted on the HMD 200 on which the three-dimensional image is displayed, so that it is possible to detect a movement of a viewer's head. Then, the image reproducing unit 11 controls the reproduction of the three-dimensional image such that the three-dimensional space implemented on the display of the HMD 200 dynamically changes in accordance with the movement of the viewer's head detected by the sensor of the HMD 200.

That is, the image reproducing unit 11 reproduces a three-dimensional image such that a front three-dimensional space expands when the viewer is facing forward, reproduces the three-dimensional image such that a three-dimensional space on a right side is expanded when the viewer turns to the right, and reproduces the three-dimensional image such that a three-dimensional space on a left side is expanded when the viewer turns to the left.

While the three-dimensional image is being reproduced by the image reproducing unit 11, the attention object detecting unit 12 detects one or more objects to which the viewer is paying attention in the three-dimensional image displayed on the HMD 200. As described above, since the three-dimensional image in a direction which the viewer is facing is always displayed on the HMD 200, it can be defined that an object displayed on the HMD 200 is the attention object.

Figure 3:
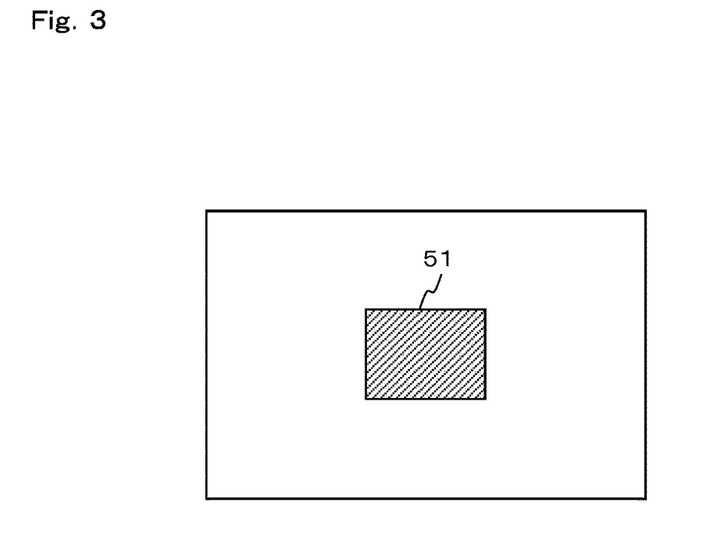
FIG. 3 is a diagram for describing an example of a method of detecting an attention object.

However, in the present embodiment, as illustrated in FIG. 3, an object displayed in a predetermined area set in a center portion of a display screen (hereinafter, referred to as a screen central region 51) is detected as the attention object. In this way, it is possible to prevent an object accidentally displayed on a peripheral portion of the display screen from being detected as the attention object. Also, in the present embodiment, an object which continues to be continuously displayed in the screen central region 51 for a predetermined time or longer is detected as the attention object. In this way, it is possible to prevent an object displayed accidentally in the screen central region 51 from being detected as the attention object while the viewer is changing a direction of the head.

When the image reproducing unit 11 has ended or stopped the reproduction of the three-dimensional image, the ranking unit 13 specifies the degree of attention by the viewer for each of the one or more attention objects detected by the attention object detecting unit 12, and ranks the objects in descending order of the degree of attention. As an example, the degree of attention is evaluated based on a length of time during which attention is paid to the object. The longer the time during which attention is paid to the object is, the higher the degree of attention is. The length of time is equivalent to the number of frames in which the attention object is displayed in the screen central region 51. Since, in each frame, identification information is attached to each object (object), it is possible to detect what identification information of the object is continuously displayed in the screen central region 51 over how many consecutive frames.

In a case where the image reproducing unit 11 has ended or stopped the reproduction of the three-dimensional image, the accompanying information transmitting unit 14 transmits, to the server apparatus 300, accompanying information corresponding to the one or more attention objects detected by the attention object detecting unit 12 along with the user ID and the like, in accordance with the ranking specified by the ranking unit 13. That is, the accompanying information transmitting unit 14 reads, from the image storage unit 15, the accompanying information corresponding to the identification information of the attention object, and transmits the accompanying information to the server apparatus 300.

The accompanying information receiving unit 31 of the server apparatus 300 receives the user ID sent from the reproduction apparatus 100 and the accompanying information of the attention object. By referring to the address storage unit 34 using the user ID received by the accompanying information receiving unit 31 as a key, the address specifying unit 32 specifies an address of the user terminal 400, which is previously stored in the address storage unit 34 in association with the user ID.

The accompanying information transmitting unit 33 transmits the accompanying information received by the accompanying information receiving unit 31 to the user terminal 400, according to the address specified by the address specifying unit 32. The accompanying information receiving unit 41 of the user terminal 400 receives the accompanying information of the attention object sent from the reproduction apparatus 100. The accompanying information providing unit 42 provides the viewer with the accompanying information received by the accompanying information receiving unit 41, in accordance with the ranking.

As described above, in the present embodiment, when display of the three-dimensional image reproduced by the image reproducing unit 11 on the HMD 200 is ended or stopped, the accompanying information corresponding to one or more attention objects detected during the reproduction, is sequentially transmitted from the reproduction apparatus 100 to the server apparatus 300 and then from the server apparatus 300 to the user terminal 400, and provided to the viewer, in accordance with the ranking of the degree of attention, through a medium different from the HMD 200 that has displayed the three-dimensional image. In the present embodiment, the medium different from the HMD 200 is the user terminal 400.

Note that, the accompanying information providing unit of the present invention is configured with the accompanying information transmitting unit 14 of the reproduction apparatus 100, the accompanying information receiving unit 31, the address specifying unit 32 and the accompanying information transmitting unit 33 of the server apparatus 300, and the accompanying information receiving unit 41 and the accompanying information providing unit 42 of the user terminal 400.

Figure 4:
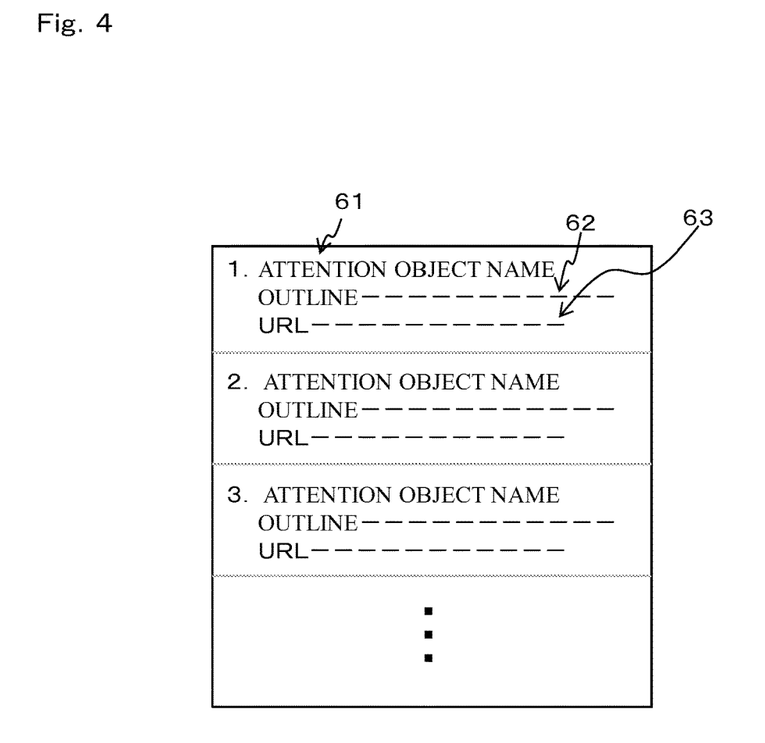
FIG. 4 is a diagram illustrating an example of a form of providing accompanying information according to the present embodiment.

Here, it is possible to apply various embodiments as a method of providing accompanying information in accordance with the ranking. For example, as illustrated in FIG. 4, one or more accompanying information can be displayed in a list in ascending order of the ranking. In an example of FIG. 4, a name 61 representing the attention object, outline information 62, and a link 63 for accessing detailed information are displayed. In this example, detailed accompanying information (text information, audio information, image information, moving image information, or the like) can be provided by clicking the link 63.

Note that, in a case where the accompanying information is configured with information such as text information and image information that can be displayed on the screen, one or more accompanying information may be displayed in a list as it is, in ascending order of the ranking.

Figure 5:
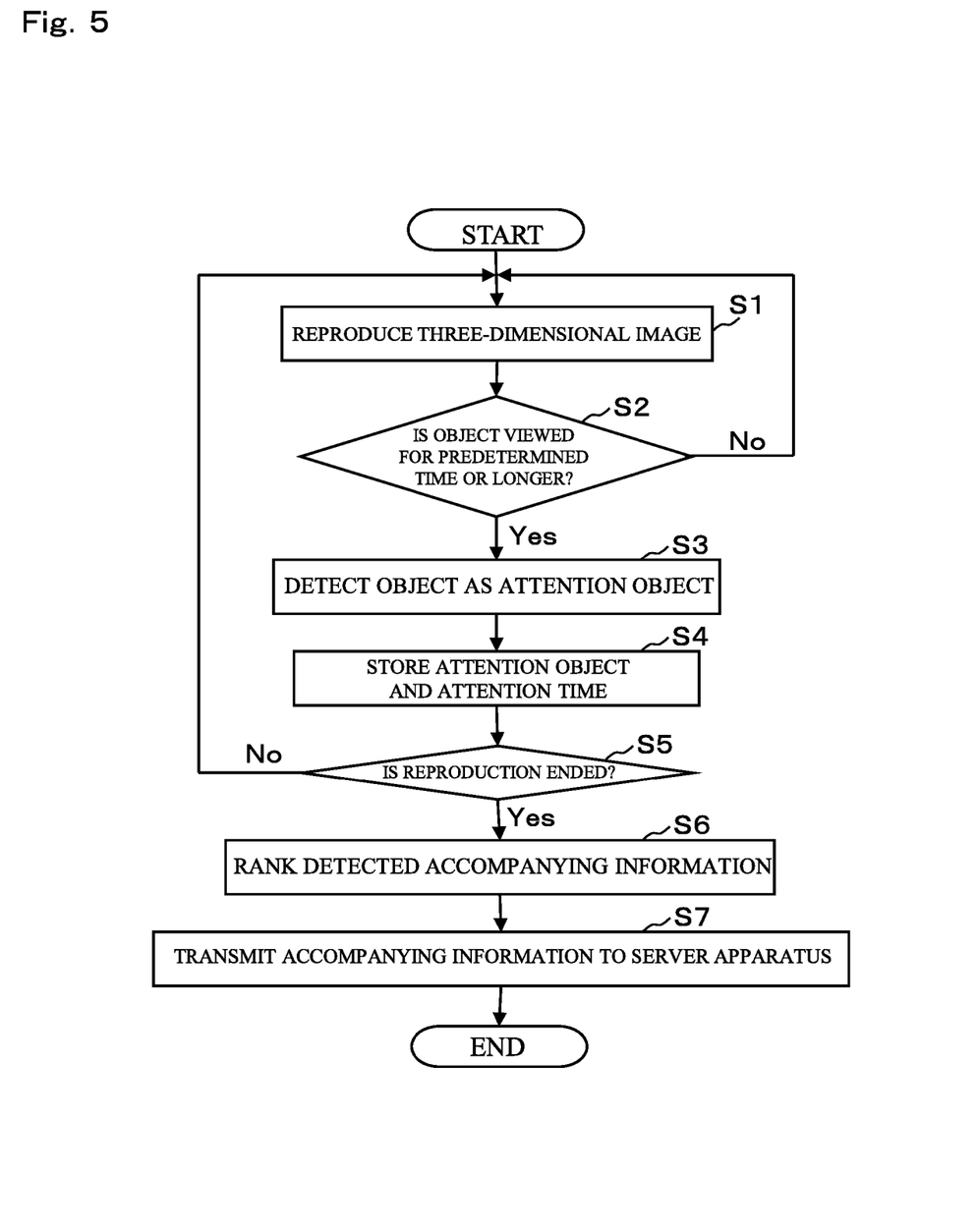
FIG. 5 is a flowchart illustrating an operation example of a reproduction apparatus according to the present embodiment.
Figure 6:
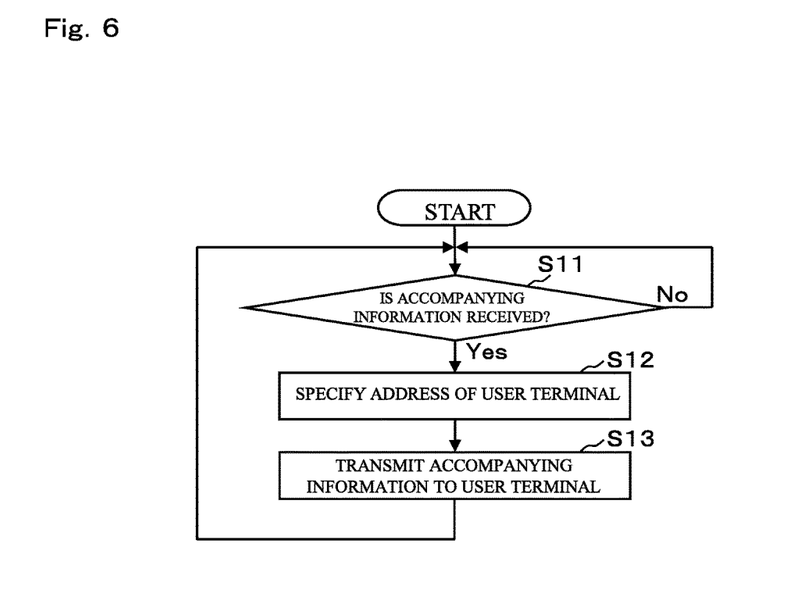
FIG. 6 is a flowchart illustrating an operation example of a server apparatus according to the present embodiment.
Figure 7:
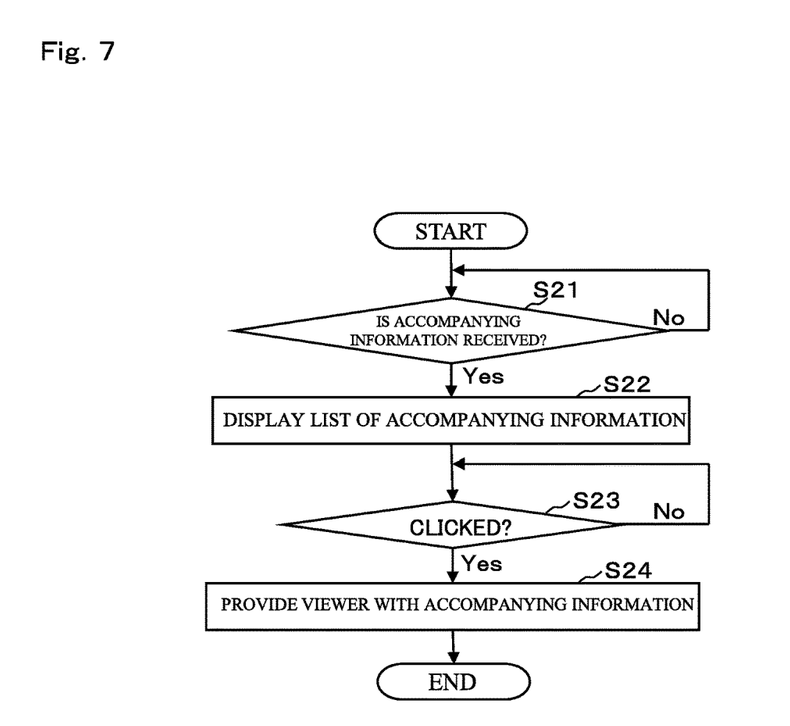
FIG. 7 is a flowchart illustrating an operation example of a user terminal according to the present embodiment.

FIGS. 5 to 7 are diagrams illustrating an example of the operations of the information providing system according to the present embodiment configured as described above. Among these diagrams, FIG. 5 illustrates an example of the operation of the reproduction apparatus 100, FIG. 6 illustrates an example of the operation of the server apparatus 300, and FIG. 7 illustrates an example of the operation of the user terminal 400, respectively.

The flowchart of the reproduction apparatus 100 illustrated in FIG. 5 is started when the reproduction button of the three-dimensional image is pressed. First, the image reproducing unit 11 reproduces the three-dimensional image stored in the image storage unit 15 and displays the three-dimensional image on the HMD 200 (step S1). Here, the image reproducing unit 11 controls the reproduction of the three-dimensional image such that the three-dimensional space implemented on the display of the HMD 200 dynamically changes in accordance with the movement of the viewer's head detected by the sensor of the HMD 200.

In a state where the three-dimensional image is reproduced, the attention object detecting unit 12 determines whether or not an object, to which identification information is attached in the image, continues to be continuously displayed in the screen central region 51 for a predetermined time or longer, that is, determines whether or not the viewer is watching the object for a predetermined time or longer (step S2). In a case where such an object does not exist, the processing returns to step S1. On the other hand, in a case where it is determined that such an object as described above exists, the attention object detecting unit 12 detects the object as an attention object (step S3).

Subsequently, the ranking unit 13 measures the length of time during which the attention object detected by the attention object detecting unit 12 continues to be displayed in the screen central region 51, that is, the length of time during which the viewer is paying attention to the object, as the degree of attention by the viewer, and stores the length of time (step S4). That is, the ranking unit 13 stores the identification information of the attention object and the length of time (degree of attention) during which the viewer is paying attention to the object, in association with each other.

Thereafter, the image reproducing unit 11 determines whether or not the reproduction of the three-dimensional image is ended or stopped (step S5), and unless the reproduction is ended or stopped, the processing returns to step S1 and the processing continues. Through a loop processing of steps S1 to S5 as described above, one or more attention objects are detected from the three-dimensional image changing with the elapse of time, and identification information on each of the attention objects is stored along with attention time (degree of attention).

Then, in a case where the reproduction of the three-dimensional image is ended or stopped, the ranking unit 13 ranks one or more attention objects based on the one or more attention objects and the attention time stored during the reproduction, in descending order of the degree of attention (step S6). Subsequently, by using the identification information of an attention objects as a key, the accompanying information transmitting unit 14 reads out, from the image storage unit 15, accompanying information corresponding to the one or more attention objects detected by the attention object detecting unit 12 during the reproduction of the three-dimensional image, and transmits the accompanying information to the server apparatus 300, in accordance with the ranking specified by the ranking unit 13 (step S7). In this way, the processing of the reproduction apparatus 100 illustrated in FIG. 5 is ended.

The flowchart of the server apparatus 300 illustrated in FIG. 6 is repeatedly executed all the time during which the power supply of the server apparatus 300 is turned on. First, the accompanying information receiving unit 31 determines whether or not the accompanying information of the attention object has been received from the reproduction apparatus 100 (step S11). In a case where the accompanying information is not received, the determination in step S11 is repeated.

In a case where the accompanying information receiving unit 31 has received the accompanying information of the attention object transmitted from the reproduction apparatus 100, the address specifying unit 32 specifies the address of the user terminal 400 corresponding to the user ID, by referring to the address storage unit 34 using the user ID received along with the accompanying information as a key (step S12).

Then, the accompanying information transmitting unit 33 transmits the accompanying information received by the accompanying information receiving unit 31 to the user terminal 400, according to the address specified by the address specifying unit 32 (step S13). Thereafter, the processing returns to step S11 and the above processing is continued.

The flowchart of the user terminal 400 illustrated in FIG. 7 starts, for example, when a dedicated application is activated. First, the accompanying information receiving unit 41 determines whether or not the accompanying information of the attention object has been received from the server apparatus 300 (step S21). In a case where the accompanying information is not received, the determination in step S21 is repeated.

In a case where the accompanying information receiving unit 41 has received the accompanying information of the attention object transmitted from the server apparatus 300, for example, as illustrated in FIG. 4, the accompanying information providing unit 42 displays a list of received one or more accompanying information in ascending order of the ranking (step S22). Then, the accompanying information providing unit 42 determines whether or not any of the links 63 displayed in the list is clicked (step S23).

In a case where any of the links 63 is clicked, the accompanying information providing unit 42 provides the viewer with the accompanying information received by the accompanying information receiving unit 41 (step S24). That is, when the accompanying information is text information, image information, moving image information or the like, the information is displayed on the display of the user terminal 400. When the accompanying information is audio information, the information is output from a speaker of the user terminal 400. In this way, the processing of the flowchart illustrated in FIG. 7 is ended.

As described above in detail, in the present embodiment, a three-dimensional image obtained by associating accompanying information with each of one or more objects included in an image changing with the elapse of time is reproduced and displayed on the HMD 200, one or more objects to which the viewer is paying attention in the three-dimensional image are detected, and the objects are ranked in descending order of the degree of attention. Then, when the reproduction of the three-dimensional image is ended or stopped, the accompanying information corresponding to one or more attention objects is provided to the viewer, in accordance with the ranking, through the user terminal 400 different from the HMD 200.

According to the present embodiment configured as described above, the accompanying information corresponding to the attention object detected when the three-dimensional image is displayed on the HMD 200 is provided to the viewer, through the user terminal 400 after the reproduction of the three-dimensional image is ended or stopped. Therefore, it is possible to provide the viewer with more useful accompanying information, without being restricted by the amount of information, the type of information, the time of providing information, and the like.

Then, the viewer can carefully confirm the aforementioned useful accompanying information, which has been provided related to the object of attention in the virtual space based on the three-dimensional image displayed on the HMD 200, at the own user terminal 400 after the HMD 200 is removed. Moreover, since accompanying information related to one or more attention objects is provided in a state of being ranked in descending order of the degree of attention, the viewer can easily confirm the accompanying information with priority from the object of high attention.

As described above, according to the present embodiment, it is possible to utilize a three-dimensional image of VR as a more useful information transmission medium.

Figure 8:
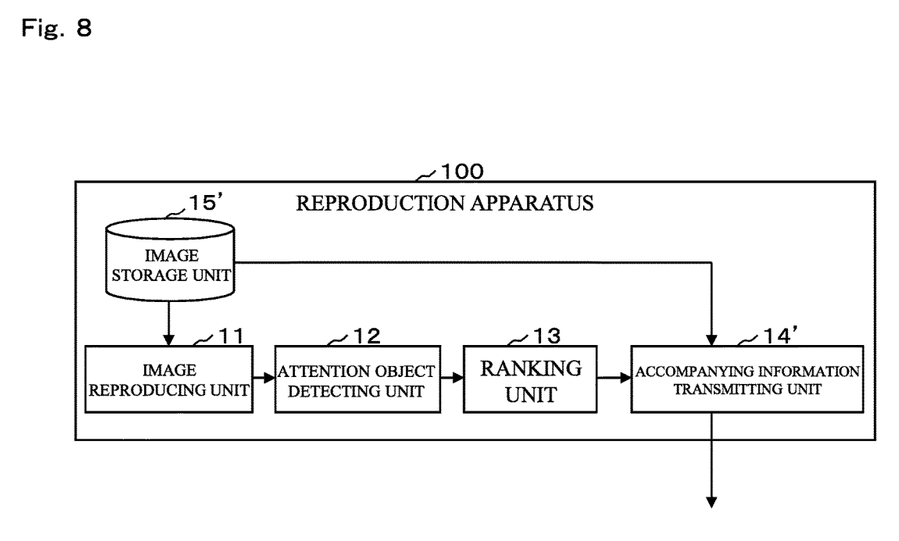
FIG. 8 is a block diagram illustrating another example of the functional configuration of the reproduction apparatus according to the present embodiment.

Note that, in the embodiment, an example, in which only the accompanying information of the attention object is provided to the viewer, has been described, but the present invention is not limited thereto. For example, a reproduced scene image of a three-dimensional image when the attention object has been displayed may be provided to the viewer along with accompanying information. FIG. 8 is a block diagram illustrating an example of the functional configuration of the reproduction apparatus 100 in this case.

In the example illustrated in FIG. 8, an accompanying information transmitting unit 14' and an image storage unit 15' are provided, instead of the accompanying information transmitting unit 14 and the image storage unit 15. Except for those units, the image reproducing unit 11, the attention object detecting unit 12, and the ranking unit 13 have the same functions as units illustrated in FIG. 2.

In addition to a three-dimensional parallax image for generating a three-dimensional space of the VR on the HMD 200, the image storage unit 15' stores a non-parallax image corresponding to the three-dimensional parallax image. The non-parallax image is a three-dimensional image or a two-dimensional image that can be displayed in a normal form on the display of the user terminal 400.

The accompanying information transmitting unit 14' transmits the reproduced scene image of the three-dimensional image when the attention object has been displayed on the HMD 200, along with the accompanying information of the attention object, to the server apparatus 300. The reproduced scene image referred to as herein is a non-parallax image corresponding to the three-dimensional parallax image when the attention object has been displayed on the HMD 200.

The three-dimensional parallax image when the attention object has been displayed on the HMD 200 can be specified by, for example, a frame identifier such as a frame number and information indicating a display direction of the image in accordance with the movement of the viewer's head. Then, the non-parallax image used as the reproduced scene image can be specified by the frame identifier of the non-parallax image corresponding to the frame identifier of the three-dimensional parallax image and the information indicating the display direction of the image.

The accompanying information and the reproduced scene image transmitted from the reproduction apparatus 100 to the server apparatus 300 are transmitted to the user terminal 400 and provided to the viewer. In this manner, since the viewer is provided with the reproduced scene image in addition to the accompanying information, the viewer can conveniently confirm what object accompanying information corresponds to, while remembering a scene viewed in the three-dimensional space of the HMD 200.

Figure 9:
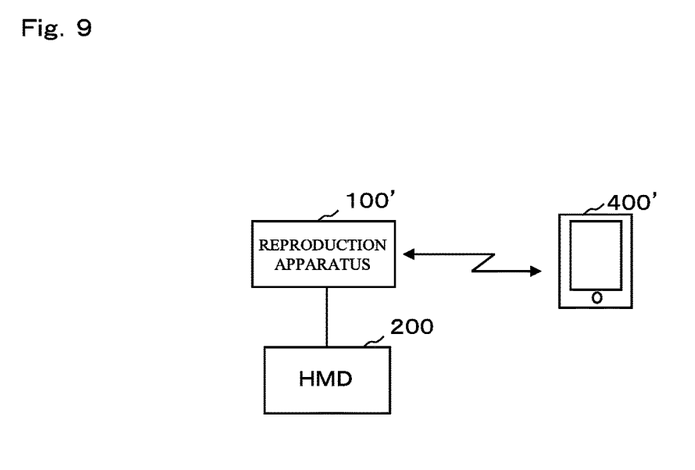
FIG. 9 is a diagram illustrating another example of the overall configuration of the information providing system according to the present embodiment.

Also, in the embodiment, an example, in which the accompanying information is provided from the reproduction apparatus 100 to the user terminal 400 through the server apparatus 300, has been described, but the present invention is not limited thereto. For example, accompanying information may be directly provided from the reproduction apparatus 100 to the user terminal 400. FIG. 9 is a diagram illustrating an example of the configuration of the information providing system in this case.

In the example illustrated in FIG. 9, the information providing system includes a reproduction apparatus 100', an HMD 200 for displaying a three-dimensional image reproduced by the reproduction apparatus 100', and a user terminal 400' for use by a viewer. The reproduction apparatus 100' and the user terminal 400' are connected by, for example, a wireless network such as a wireless LAN or Bluetooth (registered trademark), or a wired network such as a universal serial bus (USB).

An accompanying information transmitting unit (not illustrated) of the reproduction apparatus 100' transmits accompanying information to the user terminal 400' according to the address of the user terminal 400', which is previously registered on the reproduction apparatus 100'. By using the display or the speaker of the user terminal 400, the user terminal 400' provides the viewer with the accompanying information received from the reproduction apparatus 100' in accordance with the ranking.

Note that, in the case of the configuration as in FIG. 9, an accompanying information providing unit of the present invention is configured with a function of, by the reproduction apparatus 100', transmitting accompanying information to the user terminal 400' and a function of, by the user terminal 400', receiving the accompanying information and providing the viewer with the accompanying information.

Figure 10:
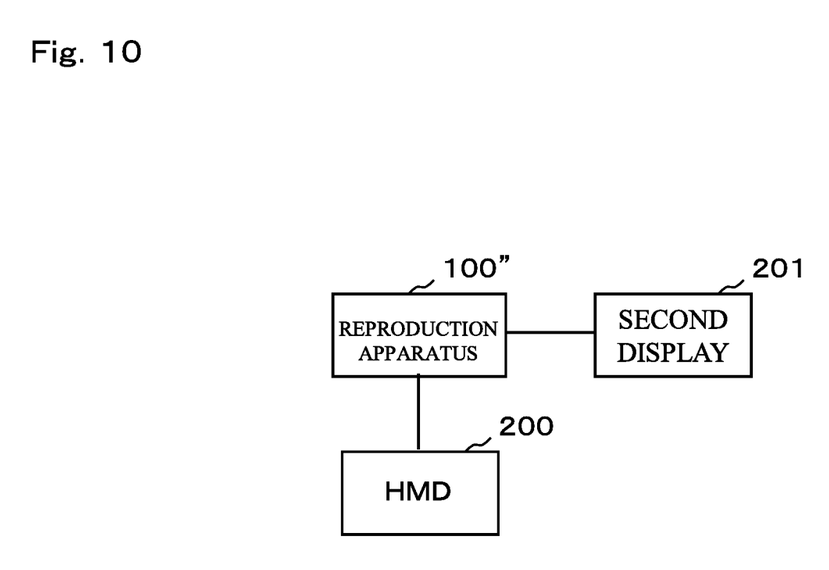
FIG. 10 is a diagram illustrating another example of the overall configuration of the information providing system according to the present embodiment.

Also, in the embodiment, an example, in which the accompanying information is provided to the viewer by using the user terminal 400 as a medium, has been described, but the present invention is not limited thereto. For example, as illustrated in FIG. 10, accompanying information may be provided to the viewer, by using a second display 201 connected to the reproduction apparatus 100" separately from the HMD 200 as a medium. The second display 201 is capable of displaying a non-parallax image in a normal form. In the case of such a configuration, the accompanying information providing unit of the present invention is configured with a function of, by the reproduction apparatus 100", displaying the accompanying information on the second display 201.

Also, in the embodiment, an example, in which an object displayed in the screen central region 51 is detected as the attention object, has been described, but the present invention is not limited thereto. For example, a gaze detection sensor may be installed on the HMD 200 to detect an actual gaze of the viewer, and an object displayed in a direction of the gaze may be detected as the attention object. Instead of the gaze detection sensor, a camera for photographing the eyes of the viewer may be provided, and the gaze of the viewer may be detected by processing an image obtained by photographing the eyes. Note that, means for detecting the gaze of the viewer is not limited to this example, and it is possible to use other known means.

Also, in a case where an HMD 200 having a function of detecting the gaze of the viewer is connected to a reproduction apparatus 100, the gaze detection function is preferentially used, and in a case where an HMD 200 having no gaze detection function is connected to the reproduction apparatus 100, the object displayed in the screen central region 51 may be detected as the attention object. Whether or not the HMD 200 has the gaze detection function may be designated by the user operating the reproduction apparatus 100, or may be automatically determined by the reproduction apparatus 100 detecting the identification information of the HMD 200.

Also, in the embodiment, an example, in which the accompanying information is displayed only on a medium other than the HMD 200, has been described, but the present invention is not limited thereto. For example, accompanying information may be displayed on a three-dimensional image during the reproduction of the three-dimensional image and may be provided to the user terminals 400 and 400' or the second display 201 even after the reproduction is ended or stopped. In this case, the contents of the accompanying information displayed during the reproduction of the three-dimensional image may be different from the contents of the accompanying information provided after the reproduction is ended or stopped. For example, there is possibly an embodiment in which simple accompanying information is displayed during the reproduction of the three-dimensional image whereas detailed accompanying information is provided to the viewer after the reproduction is ended or stopped.

Also, in the embodiment, an example, in which the reproduction apparatuses 100, 100', and 100" include the ranking unit 13, has been described, but the server apparatus 300 or the user terminal 400 may include the ranking unit 13. In this case, the reproduction apparatuses 100, 100', and 100" transmit the accompanying information of one or more attention objects and the attention time on each of the attention objects, to the server apparatus 300 or the user terminal 400.

Also, in the embodiment, an example, in which a parallax image is used as the three-dimensional image reproduced by the reproduction apparatuses 100, 100', and 100", has been described, but a non-parallax image may be used.

Also, in the embodiment, a mobile terminal such as a smartphone or a tablet terminal has been described as an example of the user terminals 400 and 400', but the present invention is not limited thereto. For example, the user terminals 400 and 400' do not necessarily have to be a mobile terminal, and can be used as long as they are a terminal which is used by the viewer and is connectable to the reproduction apparatus 100' or the server apparatus 300.

Also, in the embodiment, the example, in which the reproduction apparatuses 100, 100', and 100" are also an information providing apparatus, has been described, but a three-dimensional image reproduction apparatus and an information providing apparatus for the accompanying information may be configured separately. For example, the reproduction apparatus may include the image reproducing unit 11 and the image storage unit 15 in FIG. 2, and the information providing apparatus may include the attention object detecting unit 12, the ranking unit 13, and the accompanying information transmitting unit 14.

Besides, any of the embodiments simply describe a specific example of an embodiment for implementing the present invention and the technical scope of the present invention should not be construed in a limited manner. That is, the present invention can be implemented variously without departing from the substance or main features thereof.

REFERENCE SIGNS LIST

11 Image reproducing unit
12 Attention object detecting unit
13 Ranking unit
14, 14' Accompanying information transmitting unit
15, 15' Image storage unit
31 Accompanying information receiving unit
32 Address specifying unit 33 Accompanying information transmitting unit
41 Accompanying information receiving unit
42 Accompanying information providing unit
100, 100', 100" Reproduction apparatus
200 HMD
300 Server apparatus
400, 400' User terminal

The invention claimed is:

1. An attention object-related information providing system comprising:
   an image reproducing unit that reproduces a three-dimensional image obtained by associating accompanying information with each of one or more objects included in an image changing with the elapse of time and displays the three-dimensional image on a head-mounted display used by being worn by a viewer, wherein the three-dimensional image is reproduced such that a three-dimensional space on a direction side which the viewer is facing is expanded in accordance with a movement of a head of the viewer wearing the head-mounted display, during the reproduction of the three-dimensional image;
   an attention object detecting unit that detects one or more objects to which the viewer is paying attention, among objects displayed in the three-dimensional image displayed by the image reproducing unit;
   a ranking unit that ranks the one or more attention objects detected by the attention object detecting unit, in descending order of the degree of attention by the viewer, in a case where the reproduction of the three-dimensional image by the image reproducing unit is ended or stopped; and
   an accompanying information providing unit that provides the viewer with the accompanying information corresponding to the one or more attention objects detected by the attention object detecting unit, in accordance with a ranking specified by the ranking unit, through a medium different from the head-mounted display that has displayed the three-dimensional image, in a case where the reproduction of the three-dimensional image by the image reproducing unit is ended or stopped, wherein the medium allows displayed contents to be viewable after the head-mounted display is removed.

2. The attention object-related information providing system according to claim 1, wherein the accompanying information providing unit provides the accompanying information, along with a reproduced scene image of a three-dimensional image when the attention object has been displayed.

3. The attention object-related information providing system according to claim 2,
   wherein the three-dimensional image is a parallax image for generating a three-dimensional space of virtual reality, and
   the reproduced scene image is a non-parallax image corresponding to a three-dimensional image when the attention object has been displayed.

4. The attention object-related information providing system according to claim 1, further comprising:
   a reproduction apparatus that reproduces the three-dimensional image; the head-mounted display on which the three-dimensional image is displayed; a server apparatus; and a user terminal used by the viewer,
   wherein the accompanying information providing unit provides the accompanying information from the reproduction apparatus to the user terminal, through the server apparatus.

5. The attention object-related information providing system according to claim 1, further comprising:
   a reproduction apparatus that reproduces the three-dimensional image; the head-mounted display on which the three-dimensional image is displayed; and a user terminal used by the viewer,
   wherein the accompanying information providing unit provides the accompanying information from the reproduction apparatus to the user terminal.

6. The attention object-related information providing system according to claim 1, further comprising:
   a reproduction apparatus that reproduces the three-dimensional image; the head-mounted display on which the three-dimensional image is displayed; and a second display connected to the reproduction apparatus,
   wherein the accompanying information providing unit displays the accompanying information on the second display.

7. An attention object-related information providing method,
   that is a method of providing accompanying information related to an object, to which a viewer pays attention, among objects displayed in a three-dimensional image, in an information providing apparatus, the method comprising:
   a first step of, by an image reproducing unit of the information providing apparatus, reproducing a three-dimensional image obtained by associating accompanying information with each of one or more objects included in an image changing with the elapse of time and displaying the three-dimensional image on a head-mounted display used by being worn by a viewer, wherein the three-dimensional image is reproduced such that a three-dimensional space on a direction side which the viewer is facing is expanded in accordance with a movement of a head of the viewer wearing the head-mounted display, during the reproduction of the three-dimensional image,
   a second step of, by an attention object detecting unit of the information providing apparatus, detecting one or more objects to which the viewer is paying attention, among objects displayed in the three-dimensional image displayed by the image reproducing unit;
   a third step of, by a ranking unit of the information providing apparatus, ranking one or more attention objects detected by the attention object detecting unit, in descending order of the degree of attention by the viewer, in a case where the reproduction of the three-dimensional image by the image reproducing unit is ended or stopped; and
   a fourth step of, by an accompanying information transmitting unit of the information providing apparatus, transmitting the accompanying information corresponding to the one or more attention objects detected by the attention object detecting unit, in accordance with a ranking specified by the ranking unit, to a medium different from the head-mounted display that has displayed the three-dimensional image, in a case where the reproduction of the three-dimensional image by the image reproducing unit is ended or stopped, wherein the medium allows displayed contents to be viewable after the head-mounted display is removed.

8. The attention object-related information providing system according to claim 2, further comprising:
   a reproduction apparatus that reproduces the three-dimensional image; the head-mounted display on which the three-dimensional image is displayed; a server apparatus; and a user terminal used by the viewer,
   wherein the accompanying information providing unit provides the accompanying information from the reproduction apparatus to the user terminal, through the server apparatus.

9. The attention object-related information providing system according to claim 3, further comprising:
   a reproduction apparatus that reproduces the three-dimensional image; the head-mounted display on which the three-dimensional image is displayed; a server apparatus; and a user terminal used by the viewer,
   wherein the accompanying information providing unit provides the accompanying information from the reproduction apparatus to the user terminal, through the server apparatus.

10. The attention object-related information providing system according claim 2, further comprising:
    a reproduction apparatus that reproduces the three-dimensional image; the head-mounted display on which the three-dimensional image is displayed; and a user terminal used by the viewer,
    wherein the accompanying information providing unit provides the accompanying information from the reproduction apparatus to the user terminal.

11. The attention object-related information providing system according claim 3, further comprising:
    a reproduction apparatus that reproduces the three-dimensional image; the head-mounted display on which the three-dimensional image is displayed; and a user terminal used by the viewer,
    wherein the accompanying information providing unit provides the accompanying information from the reproduction apparatus to the user terminal.

12. The attention object-related information providing system according to claim 2, further comprising:
    a reproduction apparatus that reproduces the three-dimensional image; the head-mounted display on which the three-dimensional image is displayed; and a second display connected to the reproduction apparatus,
    wherein the accompanying information providing unit displays the accompanying information on the second display.

13. The attention object-related information providing system according to claim 3, further comprising:
    a reproduction apparatus that reproduces the three-dimensional image; the head-mounted display on which the three-dimensional image is displayed; and a second display connected to the reproduction apparatus,
    wherein the accompanying information providing unit displays the accompanying information on the second display.

* * * * *